United States Patent [19]

Barabas

[11] Patent Number: 4,475,187

[45] Date of Patent: Oct. 2, 1984

[54] BROAD BAND EXCHANGE SYSTEM TO MINIMIZE CROSSTALK USING THRESHOLD VALUE MULTIPLEX CIRCUITS

[75] Inventor: Udo Barabas, Munich, Fed. Rep. of Germany

[73] Assignee: Siemens Aktiengesellschaft, Berlin & Munich, Fed. Rep. of Germany

[21] Appl. No.: 350,257

[22] Filed: Feb. 19, 1982

[30] Foreign Application Priority Data

Mar. 12, 1981 [DE] Fed. Rep. of Germany ....... 3109470

[51] Int. Cl.³ .............................................. H04M 3/18
[52] U.S. Cl. ........................................ 370/58; 370/54; 370/59; 358/86
[58] Field of Search ...................... 358/86; 370/58, 59, 370/54

[56] References Cited

U.S. PATENT DOCUMENTS

| | | | |
|---|---|---|---|
| 4,345,273 | 8/1982 | Barabas et al. | 358/86 |
| 4,382,266 | 5/1983 | Panzer | 358/86 |

OTHER PUBLICATIONS

Digital Troubleshooting by Richard E. Gasperini, ©1975, pp. 8-6, 8-7.

Primary Examiner—Joseph A. Orsino, Jr.
Assistant Examiner—Timothy K. Greer
Attorney, Agent, or Firm—Hill, Van Santen, Steadman & Simpson

[57] ABSTRACT

In a broad-band communications system, whose subscriber lines are preferably formed by light wave guides, and by way of which television broad-band signals are transmitted as pulse-modulated signals, for television program distribution, each television program is supplied, in a plurality of time channels, to time channel individual inputs in program source individual switching planes of a broad-band switching arrangement. In order to increase the blocking attenuation, crosspoint switches which lead to one and the same output are connected via multiplex logic linking elements to the output in question of the broad-band switching arrangement. When a crosspoint switch is blocked, the broad-band signal in question then experiences the cascaded blocking attenuation of a crosspoint switch and a threshold value multiplex circuit. The crosspoint switches and the threshold value multiplex circuits are preferably formed by logic linking elements constructed in accordance with ECL technology.

11 Claims, 4 Drawing Figures

BROAD BAND EXCHANGE SYSTEM TO MINIMIZE CROSSTALK USING THRESHOLD VALUE MULTIPLEX CIRCUITS

BACKGROUND OF THE INVENTION

1. Field of the Invention

The present invention relates to a broad-band exchange system for selectively connecting broad-band signal sources to subscribers who receive broad-band signals, via a broad-band switching arrangement in which the cross point circuits, whose function is to selectively connect input lines to output lines within the switching arrangement, can be formed by logic linking elements constructed in ECL technology in order to achieve as short as possible switching times and in view of the signals which are to be switched through, are preferably pulse modulated and possess signal frequencies of, for example, up to a few hundred MHz (see Pfannschmidt: "Arbeitsgeschwindigkeitsgrenzen von Koppelnetzwerken fur Breitband-Digitalsignale", Diss. TU Bswg. 1978 and the German allowed application No. 28 28 662).

2. Description of the Prior Art

A broad-band switching arrangement of the type generally set forth above can serve, for example, to switch television programs to subscribers desirous of receiving such programs, as provided by more recent developments in telecommunications technology which have lead to broad-band communications networks in which subscriber lines are formed by light wave guides, wherein, in the subscriber plane, a star network composed of light wave guides with one light wave guide provided for each dwelling unit has proved favorable, which connects the subscriber's dwelling to a broad-band exchange (which is advantageously spatially united with the next telephone exchange), and by way of which all of the telecommunications services relating to the dwelling unit in question are handled, wherein at least the following communications possibilities should be taken into account for a residential terminal which will prove reliable in the future:

three television channels for three television receivers having independent access to all of the television signal sources which can be reached from the exchange and to all of the television programs available in the exchange;
three UKW audio radio channels (stereo);
digital telephony;
screen text;
video telephone; and
return channels for program selection and possibly for the handling of interactive services.

In a broad-band signal exchange system of this kind, not only must one and the same signal source be simultaneously connected to a plurality of subscriber terminals, but, vice-versa it must also be possible to connect one and the same subscriber terminal simultaneously to a plurality of signal sources.

For this purpose, it can be provided that the (pulse modulated) signals of the individual signal sources are multiply supplied to the input, which is individually assigned to a signal source, of a broad-band switching arrangement comprising crosspoint circuits designed in ECL technology, in each case by TDM, in a plurality of time channels, corresponding in number to the signal sources which can be simultaneously connected to one and the same subscriber, within a TDM system which comprises at the least these time channels, and in the broad-band switching arrangement the subscriber-individual outputs are each connected in time channels, individually assigned to the subscribers, from amongst the aforementioned plurality of time channels, to the desired signal source (see German Pat. No. 29 44 784).

A broad-band switching arrangement of this kind, wherein the crosspoint switches can be formed by ECL logic linking elements, can be used to transmit pulse modulated signals, for example PPM signals, of large band width.

However, broad-band signal switching is dependent not only upon broad-band characteristics or high-speed of a crosspoint switch, which in the case of a design using ECL logic linking elements also follows signal pulses having edge rise and fall times in the order of 1 ns, but also by the blocking attenuation (which exists when the cross point switch is in the blocked state) of such signal pulses. This is to say that the crosspoint switches possess only a limited blocking attenuation, thus current ECL crosspoint switches for signal bandwidths of approximately a hundred MHz can possess a blocking attenuation of approximately 40 dB, so that spatial cross talk can occur between (adjacent) transmission channels belonging to the same time slot and possibly also to time-related cross talk between transmission channels (which employ the same switch-through paths of adjacent time slots). With a blocking attenuation of approximately 40 dB, for example in the case of television transmission, this can lead to a visible cross talk between transmission channels belonging to the same time slot.

SUMMARY OF THE INVENTION

It is the object of the present invention to provide that cross talk phenomena of the type set forth above can be avoided, or at least limited to a harmless level.

According to the invention, a broad-band exchange system optionally connects broad-band signal sources, in particular television program sources, to subscribers which receive broad-band signals, via a broad-band switching arrangement comprising crosspoint circuits designed, in particular, in ECL technology, by way of which the broad-band signals, in particular TV signals, are transmitted as pulse modulated signals. The broad-band exchange system is designed in accordance with the invention so that the signals from the individual signal sources are supplied, in a plurality of time channels corresponding in number to the signal sources which can be simultaneously connected to one and the same subscriber, within TDM system comprising at least these time channels, to inputs, individually assigned to time channels, in switching planes, individually assigned to signal sources, of the broad-band switching arrangement. In the broad-band switching arrangement, the crosspoint switches, whose inputs are connected to the individual inputs of the individual switching planes, are connected at their outputs, via threshold value multiplex circuits each of which combine a plurality of crosspoint switches within a switching plane individually for each subscriber and which possess a threshold value which cannot be overshot by signals blocked on a crosspoint switch, to that output of the broad-band switching arrangement which is assigned to the subscriber in question.

The present invention, which exploits the amplitude decision threshold inherent in a threshold value circuit and also in a logic linking element, provides the advantage, with this form of switching network structure and a relatively low expense, that when a crosspoint switch is blocked, the signal in question experiences a substantially increased blocking attenuation, namely the cascaded blocking attenuation crosspoint switch and threshold value multiplex circuit, so that cross talk between transmission channels assigned to the same time slot is suppressed accordingly. The blocking attenuation can rise to twice the value, thus in the example 80 dB, if, in accordance with a further feature of the invention, both the crosspoint switches and the threshold value multiplex circuits are designed in ECL technology.

In accordance with a further feature of the invention, the threshold value multiplex circuits can be formed by threshold value switches which are connected to the output ends of the crosspoint switches and which are multiply connected at their outputs. In an alternative feature of the invention, the threshold value multiplex circuits can also be formed by multiplex logic linking elements.

In order to achieve an additional reduction in the cross talk between transmission channels which are adjacent in respect of time, advantageously, in accordance with a further feature of the invention, these crosspoint switches which lead to one and the same subscriber-individual output of the broadband switching arrangement and which are connected at their inputs to inputs of the broad-band switching arrangement which are not directly adjacent in the sequence of the associated time channels are connected to one and the same input of a threshold value multiplex circuit.

For the aforementioned multiple supply of a broadband signal to inputs, individually assigned to the time channels, of the switching plane, individually assigned to the signal sources, advantageously and in accordance with a further feature of the invention the signal source is scanned with a frequency corresponding to the number of time channels, and the pulse-modulated signals which represent the scan values are each supplied to the associated input, individually assigned to a time channel, of the switching plane in question.

In accordance with an alternative feature of the invention, however, the signal source can be scanned at a scanning rate corresponding only to one time channel, and the pulse-modulated signal which represents the scan value thus obtained is split between a plurality of line paths which correspond to the number of time channels and in which delays, each differing by the duration of one time slot, take place in a stepped fashion and which at their output ends lead to the associated input, individually assigned to a time channel, of the relevant switching plane.

In both cases it is advantageous that, in accordance with a further feature of the invention, in order to connect the individual inputs of the broad-band switching arrangement to the crosspoint switches which are assigned to the input in question and which lead to the various outputs of the broad-band switching arrangement, continuously unlocked ECL logic linking components possessing a plurality of outputs are provided, wherein crosspoint switches in which the broad-band signals have undergone $2n-2$ negations in the aforementioned ECL logic linking elements which precede the crosspoint switches in the chain circuit, on the one hand, and the crosspoint switches, wherein the broadband signals have undergone $2n-1$ negations in the aforementioned ECL logic linking elements which precede the crosspoint switches in the chain circuit, on the other hand, are formed by ECL logic linking elements which possess logic linking functions which are interchanged with one another in respect of the pulse modulated broad-band signals, and are formed, in particular, by AND gates and NOR gates.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
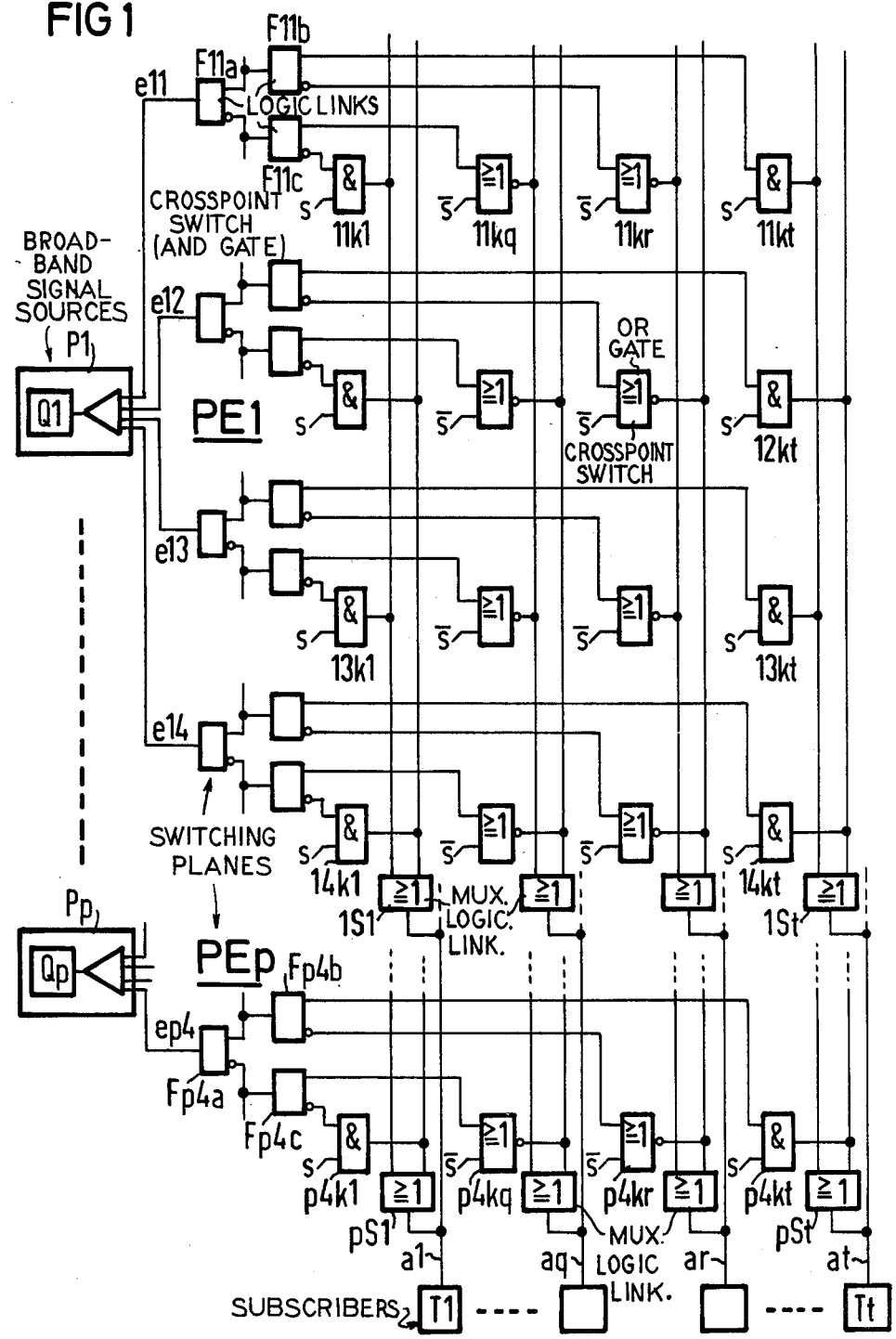
FIG. 1 is a schematic illustration of an exemplary embodiment of a broad-band exchange system constructed in accordance with the present invention.

To an extent necessary to clarify the invention, FIG. 1 schematically illustrates a broad-band exchange system comprising a broad-band switching arrangement by way of which broad-band signal sources P1 . . . Pp, which will be assumed to be formed in particular by television program sources, can be connected to a plurality of subscribers T1 . . . Tt which receive broadband signals. These subscribers will be assumed to correspond, for example, to a residential terminal to/from which a plurality of communications facilities will be assumed to be provided in the manner explained in the introductory portion of this document.

In the broad-band switching arrangement, pulse-modulated signals are switched through by means of the broad-band signals which preferably consist of TV signals, and a plurality of such signals can be transmitted in time division multiplex to the subscribers T1 . . . Tt in question, preferably via a light wave guide.

In the broad-band exchange system illustrated in FIG. 1, the signals from the individual signal sources P1 . . . Pp are supplied in a number of, for example, four time channels, which number corresponds to the number of signal sources P1 . . . Pp which can be simultaneously connected to one and the same subscriber T1 . . . Tt, within a TDM system which comprises at the least these time channels, to inputs e11, e12, e13, e14 . . . ep4, individually assigned to time channels, in switching planes PE1 . . . PEp, which are individually assigned to signal sources, of the broad-band switching arrangement. In the broad-band switching arrangement, crosspoint switches 11k1 . . . 11kt, . . . 12kt, . . . 14kt; . . . p4k1 . . . p4kt which are connected to the individual inputs e11, e12, e13, e14, . . . ep4 of the individual switching planes PE1 . . . PEp are each connected to that output a1 . . . at of the broad-band switching arrangement assigned to the subscriber T1 . . . Tt in question via threshold value multiplex circuits which, individually for each subscriber, combine a plurality of crosspoint switches 11k1 . . . 14k1 . . . 11kt . . . 14kt . . . p4k1 . . . p4kt and which are formed by multiplex logic linking elements 1s1 . . . 1st . . . ps1 . . . pst.

Therefore, the crosspoint switches 11k1 . . . p4kt and the multiplex logic linking elements by which they are combined can serve to connect the subscriber individual output a1 ... at to a desired signal source P1 ... Pp in time channels within a TDM system which are appointed to individual subscribers (preferably via subscriber return channels as referred to above).

Figure 2:
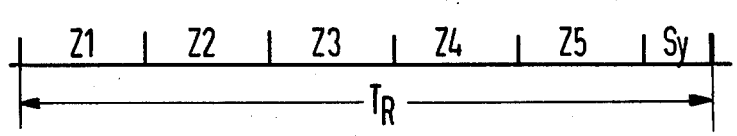
FIG. 2 is a graphic illustration of the position of the time channels in a time division multiplex frame.

FIG. 2, which illustrates the time positioning of the time slots of such time channels in a TDM frame T will not be considered. The time slots, or to be more precise a time slot of each time channel, are referenced Z1, Z2, Z3, Z4 and Z5, while Sy designates a time slot of an additional synchronizing channel which may be provided and in which a synchronizing signal can be transmitted, for example, for the synchronization of demultiplexers provided at the subscriber end. In the individual time channel Z, preferably assigned in accordance with the particular receiver, a plurality of receivers arranged in the subscriber station, a subscriber T1 ... Tt (see FIG. 1) can be connected via the crosspoint switches 11k1 ... p4kt in question (again see FIG. 1) to the individual inputs e11 ... ep4, assigned to the individual time channels, in the switching planes PE1 ... PEp assigned to the individual signal sources of the broadband switching arrangement, where a subscriber can also be connected to one and the same signal source in a plurality of time channels. In addition, at least one of the time channels (for example the time channel Z5 of FIG. 2) may be excluded from carrying out switching via the broad-band switching arrangement, as will be the case, for example, when it is connected to a 64 kbit/s standard channel of an integrated digital telecommunications network and/or UKW audio radio programs.

As already set forth above, the signals from the individual signal sources P1 ... Pp are conducted in a plurality of time channels Z, corresponding in number to the signal sources P which can be simultaneously connected to one and the same subscriber T, within the TDM system which at least comprises these time channels Z to the inputs e11 ... e14; ... ep4, assigned to the individual time channels, in the switching planes PE1 ... Pep which are individually assigned to the signal sources, of the broad-band switching arrangement, for example in four different time slots Z1, Z2, Z3 and Z4.

Figure 3:
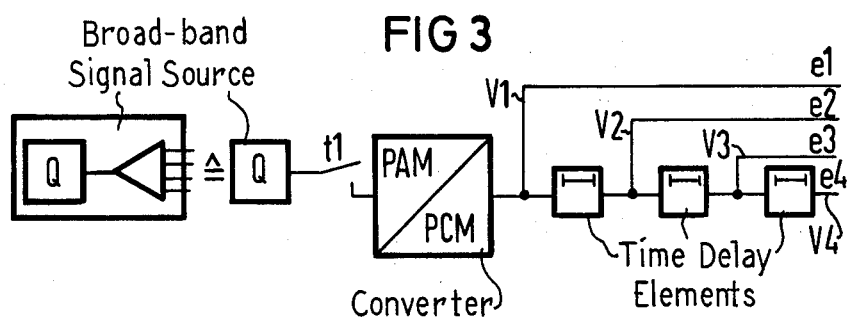
FIG. 3 illustrates further circuit details of an embodiment of the invention.

For this purpose, as indicated in FIG. 3, the actual signal source Q can be scanned at a scanning rate corresponding to only one time channel Z, at least with the minimum scanning rate governed by Shannon's theory, repeated with a period $T_R$ (FIG. 2) at a time t1, for example promptly at the start of each time slot Z1 (FIG. 2), and the scan value in question can be converted in an appropriate converter (e.g. pulse amplitude modulator/pulse code modulator PAM/PCM) into a pulse-modulated signal composed of a plurality of (PCM) or one (PPM, PFM, PDM) bivalent pulse(s), and the pulse-modulated signal which represents the scan value thus obtained can be distributed among a plurality of line paths (V1, V2, V3, V4) which corresponds to the aforementioned number of time channels (Z1 ... Z4) and in which delays which take place in a stepped fashion, each differing by the duration of a time slot, and which at their output lead to the associated input (e1 .. , e4), individually assigned to a time channel, of the relevant switching plane PE, which is assigned to an individual signal source, within the broad-band switching arrangement.

Figure 4:
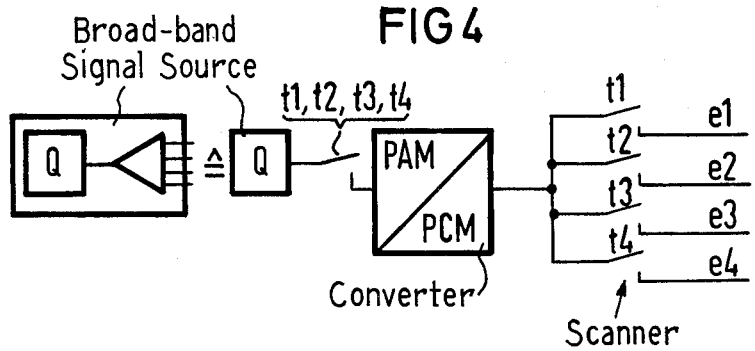
FIG. 4 illustrates yet further circuit details of an embodiment of the invention.

Instead, as illustrated in FIG. 4, the actual signal source Q can also be scanned with a greater frequency, corresponding to a plurality of time channels Z1 ... Z4, in each period $T_R$ (FIG. 2) at a plurality of times t1, t2, t3 and t4, for example promptly at the beginnings of the time slots Z1, Z3, Z3 and Z4 (FIG. 2), and the scan value obtained in this manner can be converted into bivalent pulse signals, whereupon these pulses are then supplied, in the time slots in question, to the assigned input e1 ... e4 of the switching plane, individually assigned to a signal source, within the switching arrangement.

In both cases it is ensured that every broad-band signal emitted from a signal source is available in each of the time channels in the switching plane PE, individually assigned to a signal source, within the broad-band switching arrangement and, accordingly, can be switched through to the individual subscribers via the crosspoint switches in question.

The crosspoint switches 11k1 ... p4kt are preferably formed by logic linking elements which are designed in ECL technology and which, although the same is not illustrated on the drawing, can be combined several at a time in monolithically-integrated fashion on a single chip. Assuming that the individual broad-band signal sources P1 ... Pp may not be too low ohmic and may not be subjected to very high switching capacitances, i.e. cannot be subjected to an arbitrary number of directly-connected crosspoint switches or following subscribers, constantly underlocked ECL logic linking elements, for example of the type 10101, having a plurality of outputs either without or with negation, are provided for distributing the individual inputs e11 ... ep4 of the broad-band switching arrangement between the crosspoint switches which are assigned to the input in question and which lead to the various outputs of the broad-band switching arrangement. Therefore, for example, in the broad-band switching arrangement shown in FIG. 1, assuming two-stage distribution, the input e11 is connected via a non-negating output of such a logic-linking element F11a and via a non-negating output of a further logic linking element F11b to the crosspoint switch 11kt which leads to the output, is further connected via the non-negating output of the logic linking element F11a and the negating output of a further logic linking element F11b to a crosspoint switch 11kr which leads to an output ar. The same is further connected via the negating output of the logic linking element F11a and via the non-negating output of a further logic linking element F11c to the cross point switch 11kq which leads to an output aq. The same is further connected via the negating output of the logic linking element F11a and via the negating output of a further logic linking element F11c to a crosspoint switch 11k1 which leads to an output line a1. Similarly, the input ep4 of the broad-band switching arrangement is connected via logic linking elements Fp4a, Fp4b, Fp4c to the crosspoint switches p4kt, p4kr, p4kq, p4k1 which, themselves, likewise lead to the aforementioned output at, ar, aq, a1 of the broad-band switching arrangement.

In this respect it should be noted that the aforementioned logic linking elements F11a ... Fp4c basically only need to possess one input line and, in fact, have been represented only with a single input line on the drawing, but in addition can also possess at least one further input line from which they are then constantly unlocked by the connection of an appropriate unlocking signal, i.e. are ready to transmit signals via the broad-band signal path illustrated in FIG. 1.

In the above-described exploitation of the invention, both of the outputs without negation and with negation, depending upon which distribution path leads from an input to the broad-band switching arrangement to a specific crosspoint switch, on this path a, preferably, pulse-code modulated (PC) or pulse phase modulated (PP) broad-band signal which is to be switched through can either experience, possibly multiple, negation or cannot have such an experience. Here, it may be necessary to compensate an odd number of negations by an additional negation. Advantageously, instead, and as illustrated in FIG. 1, those crosspoint switches in the case of which the broad-band signals have experienced $2n-2$ negations (where $n=1, 2, \ldots$) in the aforementioned ECL logic linking elements which precede the crosspoint switches in a chain connection, on the one hand, and those crosspoint switches in the case of which the broad-band signals have experienced $2n-1$ negations (where $n=1, 2, \ldots$) in the aforementioned ECL logic linking elements which precede the crosspoint switches in a chain connection, on the other hand, are formed by ECL logic linking elements (AND, NOR) whose logic linking functions are interchanged with one another in respect of the pulse-modulated broad-band signals. Here, an exchange of logic linking functions in respect of the pulse-modulated broad-band signals is to be understood in that the two values of the input variables corresponding to the broad-band signals are interchanged in a truth table or operating table of the logic linking elements. Therefore, in the switching arrangement illustrated in FIG. 1, the crosspoint switches $11kt \ldots p4k1$ and $11kt \ldots p4kt$, in the case of which the broad-band signals have experienced no negations and two negations, respectively, on the path from the input e11 and the input ep4, respectively, are formed by AND gates, for example of the type 10104, while the crosspoint switches $11kq \ldots p4kq$ and $11kr \ldots p4kr$, in the case of which the broad-band signals have experienced one negation (and an odd number of negations) respectively, on the path from the input e11 $\ldots$ ep4 are formed, on the other hand, by NOR gates for example of the type 10102. In such a design using AND gates and NOR gates, the logic linking functions are not only interchanged in respect of the pulse-modulated broad-band signals, but also in respect of the control signals which are to be supplied to the crosspoint switches via their drive lines, which means that the control signals must be supplied in negated form to the control inputs $\overline{s}$ of the crosspoint switches formed by NOR gates.

Although this has not been illustrated in detail in FIG. 1, the drive lines s and $\overline{s}$ of the crosspoint switches $11k1 \ldots p4kt$ can be connected to the individual outputs of a drive decoder which is, in each case, assigned to a series of crosspoint switches, e.g. the crosspoint switches $11kt \ldots p4kt$, and from which the individual crosspoint switches can be rendered conductive by appropriate control signals which remain in existence for the entire duration of the switch-through operation.

As can be seen from FIG. 1, in the broad-band exchange system illustrated therein, the crosspoint switches $11k1 \ldots 14kt$ by way of which the input e11 $\ldots$ e14, which are individually assigned to time channels, of the switching plane PE1 assigned to the broad-band signal source P1 can be connected to the output line a1 which leads to the subscriber T1, do not lead directly to the output line a1, but extend via a multiplex logic linking element $1s1$ which serves to combine the crosspoint switches $11k1 \ldots 14k1$. Furthermore, in FIG. 1 it is indicated that the crosspoint switches $\ldots p4k1$ which are connected to the inputs $\ldots$ ep4, individually assigned to time channels, of the switching plane PEp assigned to the broad-band signal source Pp do not lead directly to the output lines a1, but extend via a multiplex logic linking element pS1. Similarly, the crosspoint switches $11kt \ldots 14kt$ which are connected to the inputs e11 $\ldots$ e14, individually assigned to time channels, of the switching plane PE1 are connected to the output line at assigned to the subscriber Tt via a following multiplex logic linking element 1St which combines the crosspoint switches. The crosspoint switches $\ldots p4kt$ which are connected to the inputs $\ldots$ ep4, individually assigned to time channels, of the switching plane PEp lead to the output line at via a multiplex logic linking element pSt. Here, the multiplex logic linking elements $1s1 \ldots$ pSt are advantageously likewise designed in ECL technology. In FIG. 1 it is indicated that the multiplex logic linking elements which form the threshold value multiplex circuits can be formed by OR gates.

Only those crosspoint switches whose inputs are connected to inputs of the broad-band switching arrangement which are not directly adjacent in the sequence of the associated time channels are connected to one and the same input of a multiplex logic linking element. Therefore, only those crosspoint switches $11k1$ and $13k1$ which are connected to the time channel individual inputs e11 and e13 and are thus assigned to the time channels Z1 and Z3 (FIG. 2) which are not directly adjacent are connected to one and the same (left-hand) input of the input multiplex logic linking element 1S1. Only those crosspoint switches $12k1$ and $14K1$ which are connected to the time channel individual input e12 and e14 and thus are assigned to the time channels Z2 and Z4 (FIG. 2) are connected to another (right-hand) input of the multiplex logic linking element 1S1. Similarly, the crosspoint switches $11kt$ and $13kt$ which are connected to the input e11 and e13 assigned to the time channels Z1 and Z3 (FIG. 2) are connected to the first (left-hand) input of the multiplex logic linking element 1St, whereas the two crosspoint switches $12kt$ and $14kt$ whose inputs are connected to those inputs e12 and e14 of the switching plane PE1 which are assigned to the time channels Z2 and Z4 (FIG. 2) lead to the other (right-hand) input of the multiplex logic linking element 1St.

If a specific subscriber, for example the subscriber Tt, should fail to receive a specific broad-band signal, for example the broad-band signal emitted from the signal source Pp, in a specific time channel, for example the time channel Z4, and if, therefore, the crosspoint switch $p4kt$, which is located as it were at the intersection of the time channel individual input line ep4 in the signal source individual switching plane PEp and the subscriber-individual output line at should be blocked from its drive line s, then the signal which is pulse-modulated with the aforementioned broad-band signal in the time channels Z4 is forwarded, merely as an "interference wave" weakened by the blocking attenuation of the crosspoint switch p4kt of (in the case of an ECL crosspoint switch) approximately 40 dB, to the input of the multiplex logic linking element pSt. Because of its inherent amplitude decision threshold, in accordance with its transmission characteristics, the multiplex logic linking element pSt now represents a signal threshold which cannot be overshot by this "interference wave" so that the signal, which has already been blocked by the crosspoint switch P4kt, experiences a further blocking attenuation, in the case of an ECL multiplex logic linking element of a further 40 dB, as a result of the multiplex logic linking element pSt. The resultant blocking attenuation, which in the present example is therefore increased to a double value of 80 dB, results in a corresponding suppression of spatial cross talk in the relevant time channel Z4, in which the subscriber Tt in question is supplied with the broad-band signal emanating from the signal source P1, for example the crosspoint switch 14$kt$. The same applies, although it will not be discussed in detail, to all of the other combinations of blocking crosspoint switches and multiplex logic linking elements; any disturbing crosstalk phenomena between transmission channels occupying the same time slot are therefore safely avoided.

At the same time, however, a time-related crosstalk between transmission channels which use the same switching network sections and which occupy adjacent time slots is likewise suppressed. If, for example, the subscriber Tt is supplied, for example via the crosspoint switch 12$kt$, in the time channel Z2 (FIG. 2) with the broad-band signal emanating from the signal source P1, then follow-up pulses which are related to the signal pulse is transmitted in the time channel Z2 and which occur in the following time channel Z3 (FIG. 2) reach the same input of the multiplex logic linking element 1St which follows the crosspoint switch 12$kt$ and to which the crosspoint switch 12$kt$ but not a crosspoint switch which switches through in the following time channel Z3 is connected. The crosspoint switch 13$kt$ which switches through in the following time channel Z3 is, in fact, connected to the other input of the multiplex logic linking element 1St. In the multiplex logic linking element pSt the follow-up signal would therefore also have to overcome a response threshold inherent in the latter, for which purpose the follow-up signal is, however, too weak. Therefore, here again, disturbing crosstalk phenomena are avoided.

Finally, it should be pointed out that the TDM combination of broad-band signals from adjacent time channels which, in the broad-band exchange system constructed in accordance with the present invention, does not take place until the output of the broad-band switching arrangement is particularly advantageous in the use of monolithically, highly-integrated rows of switches or multiple switches, where there is no possibility of intervention into the actual switching arrangement.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A broad-band exchange system for selectively connecting broad-band signal sources to subscriber stations which receive broad-band signals, comprising:
    a crosspoint matrix including a plurality of crosspoint switches arranged in a plurality of switching planes and in columns and rows in each of said switching planes;
    a plurality of broad-band signal sources each assigned to a respective switching plane and each including scanning means operable to provide signals in a plurality of time channels equal in number to the number of channels which can be simultaneously connected to a subscriber station;
    input means including a plurality of input logic circuits each connecting the crosspoint switches of a respective row to receive signals of a respective channel of the signal source assigned to that respective switching plane;
    output means including a plurality of threshold value multiplex circuits each connected to the crosspoint switches of a column of a respective switching plane, and a plurality of subscriber output lines each connected to the threshold value multiplex circuits of corresponding columns of each switching plane, each of said threshold value multiplex circuits having a threshold value which cannot be overshot by signals which are blocked by an appertaining crosspoint switch.

2. The broad-band exchange system of claim 1, wherein:
    said scanning means comprises means for scanning at a frequency corresponding to the number of time channels and providing modulated signals representing the scan values to the associated time channels of the associated switching plane.

3. The broad-band exchange system of claim 1, wherein:
    said scanning means comprises means for scanning at a scanning rate which corresponds to a single time channel; and
    means including a plurality of serially-connected delay devices and a plurality of taps for distributing the signal in a stepped manner by one time channel each, and said taps connected to said input means of the associated switching plane.

4. The broad-band exchange system of claim 1, wherein:
    each of said threshold value multiplex circuits comprises a multiplex logic linking element.

5. The broad-band exchange system of claim 1, wherein:
    each of said threshold value multiplex circuit includes a threshold value switch and an output which is connected to the respective subscriber output line in common with the outputs of other threshold value multiplex circuits of different switching planes.

6. The broad-band exchange system of claim 1, wherein:
    each of said threshold value multiplex circuits comprises a first input which is connected to those of said crosspoint switches which are not of adjacent rows and a second input which is connected to those crosspoint switches which are not of adjacent rows but alternate with the first-mentioned adjacent rows.

7. The broad-band exchange system of claim 1, wherein:
    said crosspoint switches are ECL switches.

8. The broad-band exchange system of claim 1, wherein:
    said threshold value multiplex circuits are ECL switches.

9. The broad-band exchange system of claim 1, wherein:
    said crosspoint switches and said threshold value multiplex circuits are ECL switches.

10. The broad-band exchange system of claim 1, wherein:
    said crosspoint switches comprise AND gates and NOR gates.

11. The broad-band exchange system of claim 1, wherein:
said input logic circuits each comprise continuously unlocked logic linking elements including chain-connected elements some of which provide negation,
some of said crosspoint switches, in the case of $2n-2$ negations where $n=1, 2\ldots$, comprise AND gates; and
others of said crosspoint switches, in the case of $2n-1$ negations, where $n=1, 2\ldots$, comprise NOR gates.

* * * * *